(12) United States Patent
Sintorn et al.

(10) Patent No.: US 10,721,151 B2
(45) Date of Patent: Jul. 21, 2020

(54) METHOD FOR LOCATING A BOTTLENECK IN A RADIO COMMUNICATION NETWORK

(71) Applicant: Telefonaktiebolaget LM Ericsson (publ), Stockholm (SE)

(72) Inventors: Mathias Sintorn, Sollentuna (SE); Ann-Christine Eriksson, Enköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 16 days.

(21) Appl. No.: 15/760,489

(22) PCT Filed: Oct. 15, 2015

(86) PCT No.: PCT/SE2015/051092
§ 371 (c)(1),
(2) Date: Mar. 15, 2018

(87) PCT Pub. No.: WO2017/065656
PCT Pub. Date: Apr. 20, 2017

(65) Prior Publication Data
US 2018/0278507 A1 Sep. 27, 2018

(51) Int. Cl.
*H04L 12/26* (2006.01)
*H04W 24/08* (2009.01)
*H04W 28/02* (2009.01)

(52) U.S. Cl.
CPC .......... *H04L 43/0864* (2013.01); *H04L 43/16* (2013.01); *H04W 24/08* (2013.01); *H04W 28/0236* (2013.01); *H04L 43/0888* (2013.01)

(58) Field of Classification Search
CPC . H04L 43/16; H04L 43/0888; H04L 43/0864; H04L 12/26; H04W 28/0236;
(Continued)

(56) References Cited

U.S. PATENT DOCUMENTS 7,636,321 B1 12/2009 Iannaccone et al.
2004/0133391 A1* 7/2004 Bovo .................. H04J 3/0682
702/178
(Continued)

FOREIGN PATENT DOCUMENTS

EP 14294940 A1 6/2004
WO 2015124210 A1 8/2015

OTHER PUBLICATIONS

Ding et al ("TCP Stretch Acknowledgements and Timestamps: Findings and Implications for Passive RTT Measurement", Jul. 2015).*

(Continued)

*Primary Examiner* — Abdelillah Elmejjarmi
(74) *Attorney, Agent, or Firm* — Withrow & Terranova, PLLC

(57) ABSTRACT

The present disclosure relates to a method performed in a Radio Access Network (RAN) comprised in a communication network, for locating a communication bottleneck in said communication network. The method comprises estimating a first Round Trip Time (RTT) between the RAN and a terminal device connected via the RAN. The method also comprises estimating a second RTT between the RAN and a server of a service provider configured for providing a service to the terminal device via the RAN. The method also comprises estimating an end-to-end RTT between the terminal device and server, based on the first and second RTT. The method also comprises determining a relative contribution of the second RTT to the end-to-end RTT. The method also comprises determining that the relative contribution of the second RTT indicates that signalling performance between the server and terminal device is limited by the signalling performance between the server and RAN.

14 Claims, 3 Drawing Sheets

(58) Field of Classification Search
CPC ......... H04W 24/08; H04W 4/08; H04W 8/02; H04W 28/02
See application file for complete search history.

(56) References Cited

U.S. PATENT DOCUMENTS

| | | | | |
|---|---|---|---|---|
| 2005/0213586 A1* | 9/2005 | Cyganski | ............ | H04L 41/0896 370/395.41 |
| 2012/0269082 A1* | 10/2012 | Morper | ............... | H04L 43/0852 370/252 |
| 2015/0045049 A1* | 2/2015 | Sawai | ................. | H04W 52/244 455/452.1 |

OTHER PUBLICATIONS

Jain, A., et al., "Requirements and reference architecture for Mobile Throughput Guidance Exposure," Internet Engineering Task Force, Internet-Draft, draft-sprecher-mobile-tg-exposure-req-arch-00.txt, Feb. 19, 2015, 13 pages.

International Search Report and Written Opinion for International Patent Application No. PCT/SE2015/051092, dated Jul. 1, 2016, 9 pages.

* cited by examiner

METHOD FOR LOCATING A BOTTLENECK IN A RADIO COMMUNICATION NETWORK

This application is a 35 U.S.C. § 371 national phase filing of International Application No. PCT/SE2015/051092, filed Oct. 15, 2015, the disclosure of which is incorporated herein by reference in its entirety.

TECHNICAL FIELD

The present disclosure relates to a method for locating a communication bottleneck in a radio communication network.

BACKGROUND

End user experience or Quality of Experience (QoE) is a differentiator for mobile operators and internet service providers. Applications are increasingly attempting to adapt to ensure a good QoE. For example, Adaptive Bit Rate video adapts the required throughput by changing media rate by using an encoded video format with a suitable bitrate. Currently this is done by trying to estimate the throughput between the service provider server and the application (app) in the client (e.g. in a User Equipment, UE), e.g. based on measured link bit rate or round trip time (RTT). How frequently the bitrate can be changed varies. A typical interval for adaptive video streaming would be every 2-5 seconds.

Feedback of available throughput from Radio Access Network (RAN) nodes to nodes outside of the RAN is being discussed (e.g. in Third Generation Partnership Project (3GPP), Institute of Electrical and Electronics Engineers (IEEE), and Internet Engineering Task Force (IETF) proposals) to improve end user QoE.

In the IETF informal internet draft, "Requirements and reference architecture for Mobile Throughput Guidance Exposure" by A. Jain et al. 19 Feb. 2015, a throughput guidance is sent from the mobile network to a Transmission Control Protocol (TCP) server. The idea is to have a Throughput guidance provider residing in the RAN, which feeds the TCP server periodically with estimated throughput in downlink per UE or per flow. Regarding the accuracy of the throughput guidance it is stated that the throughput guidance should be treated only as an estimate to the optimization algorithm running at the TCP server. The TCP server that receives this information should not assume that it is always accurate and up to date. Specifically, the TCP server should check the validity of the information received and if it finds it erroneous it should discard it and possibly take other corrective actions (e.g., discard all future throughput guidance information from a particular Internet Protocol (IP) prefix).

SUMMARY

In Transmission Control Protocol (TCP) end-points, the total available end-to-end throughput is estimated through RTT measurements. To improve the TCP performance, it could be proposed to use throughput estimations from the RAN to adjust the TCP behaviour.

A possibility would be to introduce an interface for interaction between the service provider server and the mobile/operator network of a communication network, for improving the QoE of the end-user. An additional possibility would be to also introduce an interface for interaction between the client (in a radio device, e.g. UE or other terminal device) and the mobile/operator network, for improving the QoE of the end-user. Such an interface between the mobile/operator network and a terminal device could include an interaction gateway (IGW) in the network side (typically in the RAN or uplink of the Packet Data Network, PDN, Gateway (PGW), e.g. in the SGi interface, in the network). By means of the IGW, control information may be sent between the app (acting as a service client) in the terminal device and the mobile/operator network (e.g. the RAN thereof) via user plane communication/bearers, which may be advantageous since the app typically has no access to control plane bearers between the terminal device and the RAN.

One example use case for interaction by means of the IGW is network assistance (which aims to improve QoE), where the client in the terminal device sends a query message to the RAN node asking for the available bitrate. This query is handled by the IGW which interacts with a function for recommendation, and an achievable bit rate is estimated/predicted for the terminal device. Then, a response message is sent back to the terminal device. The achievable bitrate depends on a number of factors, e.g. number of terminal devices/UEs in the cell served by the RAN node that needs to share the capacity, the radio conditions of the terminal device, and the priority for the bearer dedicated to the service.

Since a 3GPP RAN node decides the resource allocation for each bearer, the RAN node is also capable of telling the available throughput for each bearer. This information could be useful for end-points, such as the terminal device and/or the server, since this this information could be used to determine how/what data to send to maximize end-user QoE. However, if the available throughput in the RAN is not limiting (i.e. a bottleneck is outside of the RAN), the information about available throughput in the RAN is less useful in order to optimize end-to-end QoE.

Thus, a problem with the above discussed solution with an IGW is that even if available throughput in RAN is fed back to the end-point e.g. the video client app or TCP server, the end-point cannot be sure that the RAN is limiting the end-to-end throughput (i.e. comprises the bottleneck). There is currently no method for the end-point to determine the relevance of the information of available throughput in the RAN. The bottleneck may be the back-haul transport network or the server/Content Distribution Network (CDN) itself. This implies that the end point is not sure that an action based on information about available throughput in the RAN would lead to improved end-to-end QoE since this depends on whether the RAN is the bottleneck or not.

In the present disclosure, it is proposed that, possibly in addition to information about available throughput (or congestion situation) in the RAN, information about the RAN addition to packet delay is determined in order to locate the bottleneck. This information could be used to determine the relevance of the information about available throughput in the RAN. The information may either be sent to terminal device, or be used by the RAN itself. With this bottleneck information, in relation to estimations of total end-to-end delay or RTT, a more correct decision about how to utilize the information about the throughput estimations in RAN could be made. Also in other use cases, information about the location of a bottleneck may be relevant.

According to an aspect of the present disclosure, there is provided a method performed in a RAN comprised in a communication network, for locating a communication bottleneck in said communication network. The method comprises estimating a first RTT between the RAN and a terminal device connected via the RAN. The method also comprises estimating a second RTT between the RAN and a server of a service provider configured for providing a service to the terminal device via the RAN. The method also comprises estimating an end-to-end RTT between the terminal device and the server, based on the first RTT and the second RTT The method also comprises determining a relative contribution of the second RTT to the end-to-end RTT. The method also comprises determining that the relative contribution of the second RTT indicates that signalling performance between the server and the terminal device is limited by the signalling performance between the server and the RAN. This would thus imply that the bottleneck is not in the RAN but higher up in the communication network, e.g. in the Core Network (CN) of the operator network, in the PDN such as the Internet, or in the CDN (comprising the server) of the service provider.

According to another aspect of the present disclosure, there is provided a computer program product comprising computer-executable components for causing a RAN node to perform an aspect of the method of the present disclosure when the computer-executable components are run on processor circuitry comprised in the RAN node.

The method may be performed by a RAN node, e.g. a Node B or an evolved Node B (eNB), e.g. configured by means of the computer program product mentioned above. Thus, according to another aspect of the present disclosure, there is provided a RAN node for a communication network, configured for locating a communication bottleneck in said communication network. The RAN node comprises processor circuitry, and storage storing instructions executable by said processor circuitry whereby said RAN node is operative to estimate a first RTT between the RAN node and a terminal device connected via the RAN node. The RAN node is also operative to estimate a second RTT between the RAN node and a server of a service provider configured for providing a service to the terminal device via the RAN node. The RAN node is also operative to estimate an end-to-end RTT between the terminal device and the server, based on the first RTT and the second RTT. The RAN node is also operative to determine a relative contribution of the second RTT to the end-to-end RTT The RAN node is also operative to determine that the relative contribution of the second RTT indicates that signalling performance between the server and the terminal device is limited by the signalling performance between the server and the RAN.

According to another aspect of the present disclosure, there is provided a computer program for locating a communication bottleneck in a communication network comprising a RAN. The computer program comprises computer program code which is able to, when run on processor circuitry of a RAN node, cause the RAN node to estimate a first RTT between the RAN node and a terminal device connected via the RAN node. The code is also able to cause the RAN node to estimate a second RTT between the RAN node and a server of a service provider configured for providing a service to the terminal device via the RAN node. The code is also able to cause the RAN node to estimate an end-to-end RTT between the terminal device and the server, based on the first RTT and the second RTT. The code is also able to cause the RAN node to determine a relative contribution of the second RTT to the end-to-end RTT. The code is also able to cause the RAN node to determine that the relative contribution of the second RTT indicates that signalling performance between the server and the terminal device is limited by the signalling performance between the server and the RAN.

According to another aspect of the present disclosure, there is provided a computer program product comprising an embodiment of the computer program of the present disclosure and a computer readable means on which the computer program is stored.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
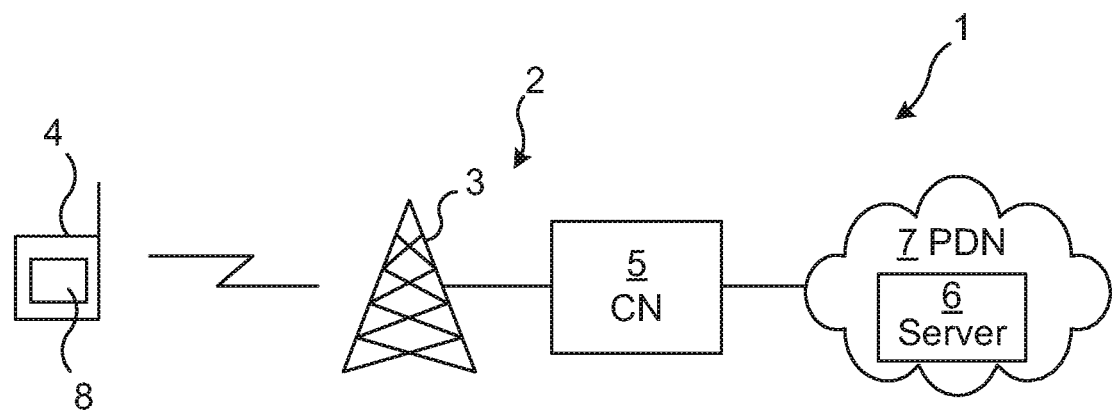
FIG. 1 is a schematic illustration of an embodiment of a communication network in accordance with the present disclosure.

FIG. 1 is a schematic overview of a communication network 1 comprising a RAN 2, e.g. of an operator network also comprising a Core Network (CN) 5 via which the RAN offers connection to a PDN 7, such as the Internet. The RAN 2 may be any type of RAN such as a cellular RAN or a Wireless Local Area Network (WLAN) RAN, but may typically be a cellular RAN in accordance with a 3GPP standard, such as Long Term Evolution (LTE). The RAN comprises one or a plurality of base stations 3, e.g. a Node B or an evolved Node B (eNB). The RAN 2 serves one or a plurality of terminal device(s) 4 and offers data connection to the PDN 7 for the terminal device(s) 4. The terminal device 4 may be connected directly to a base station 3 of the RAN 2, or be, e.g. a tethering device, connected via another radio device which is connected directly to the base station 3. The terminal device 4 may be any device or user equipment (UE), mobile or stationary, enabled to communicate over a radio channel in the communication network 1, for instance but not limited to e.g. mobile phone, smartphone, modem, sensors, meters, vehicles (e.g. a car), household appliances, medical appliances, media players, cameras, or any type of consumer electronic, for instance but not limited to television, radio, lighting arrangements, tablet computer, laptop, or personal computer (PC). A server 6, e.g. comprised in a CDN, of a service provider resides in, or is accessible via, the PDN 7. The service provider can provide a service from the server 6 to a service client 8 in the terminal device 4. The service client could be a service application (app) in the terminal device 4, e.g. a smartphone, but could also/alternatively be a script in a browser in the terminal device. There may be a service level communication between the service client 8 in the terminal device 4 and the server 6 of the service provider. The client 8 is thus configured for service level communication with the service provider, e.g. with the server 6.

Figure 2:
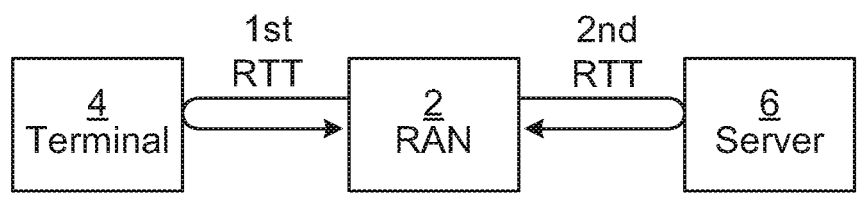
FIG. 2 is a schematic block diagram illustrating estimated RTT in an embodiment of the communication network in accordance with the present disclosure.

FIG. 2 schematically illustrates the first and second RTT, respectively, in the communication network 1. The first RTT is measured/estimated between the RAN 2 and the terminal device 4, e.g. the client 8 in said terminal device, from the RAN to the terminal device and back again to the RAN. The second RTT is measured/estimated between the RAN and the server 6 providing the service of the service provider, from the RAN to the server and back again to the RAN. Based on the first and second RTT, as estimated, the total (end-to-end) RTT between the terminal device/client and the server is estimated, e.g. as the sum of the first and second RTTs.

Figure 3A:
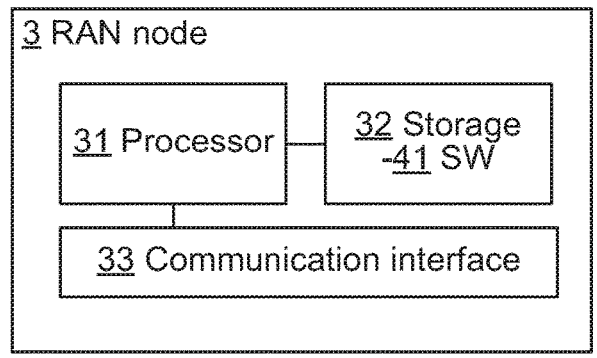
FIG. 3a is a schematic block diagram of an embodiment of a RAN node in accordance with the present disclosure.

FIG. 3a schematically illustrates an embodiment of a RAN node 3 of the present disclosure. The RAN node 3 comprises processor circuitry 31 e.g. a central processing unit (CPU). The processor circuitry 31 may comprise one or a plurality of processing units in the form of microprocessor(s). However, other suitable devices with computing capabilities could be comprised in the processor circuitry 31, e.g. an application specific integrated circuit (ASIC), a field programmable gate array (FPGA) or a complex programmable logic device (CPLD). The processor circuitry 31 is configured to run one or several computer program(s) or software (SW) 41 (see also FIG. 4) stored in a storage 32 of one or several storage unit(s) e.g. a memory. The SW 41 may additionally or alternatively comprise a computer program for configuring the RAN node 3 to perform an embodiment of the method discussed herein. The storage unit is regarded as a computer readable means 42 (see FIG. 4) as discussed herein and may e.g. be in the form of a Random Access Memory (RAM), a Flash memory or other solid state memory, or a hard disk, or be a combination thereof. The processor circuitry 31 may also be configured to store data in the storage 32, as needed. The RAN node 3 also comprises a communication interface 33 comprising a radio interface comprising radio transmitter and radio receiver, which may be combined to form a transceiver or be present as distinct units within the RAN node 3.

According to an aspect of the present disclosure, there is provided a RAN node 3 for a communication network 1. The RAN node is configured for locating a communication bottleneck in said communication network. The RAN node comprises processor circuitry 31, and storage 32 storing instructions 41 executable by said processor circuitry whereby said RAN node is operative to estimate a first RTT between the RAN node 3 and a terminal device 4 connected via the RAN node. The RAN node is also operative to estimate a second RTT between the RAN node 3 and a server 6 of a service provider configured for providing a service to the terminal device via the RAN node. The RAN node is also operative to estimate an end-to-end RTT between the terminal device 4 and the server 6, based on the first RTT and the second RTT. The RAN node is also operative to determine a relative contribution of the second RTT to the end-to-end RTT. The RAN node is also operative to determine that the relative contribution of the second RTT indicates that signalling performance between the server and the terminal device 4 is limited by the signalling performance between the server 6 and the RAN 2.

Figure 3B:
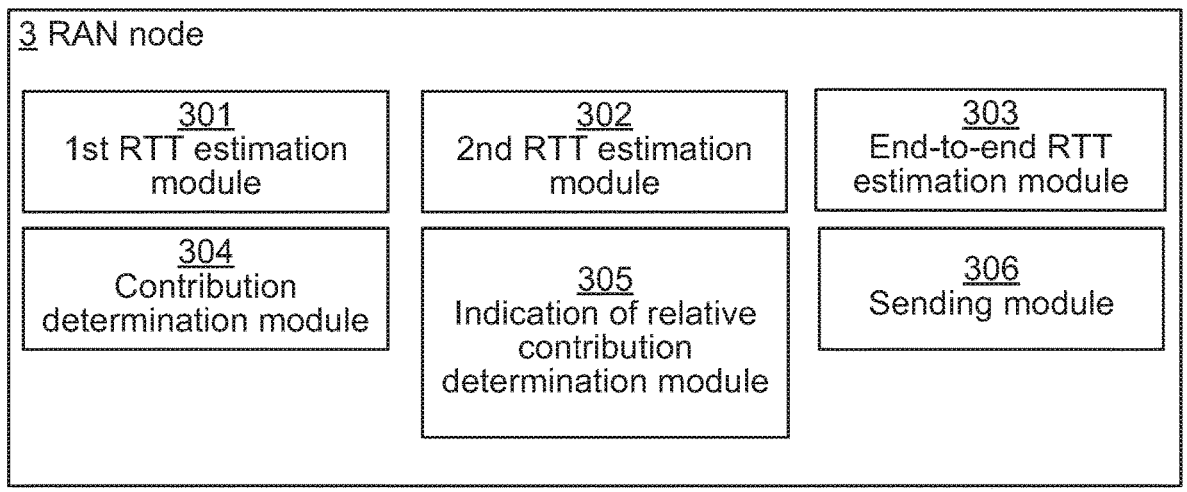
FIG. 3b is a schematic functional block diagram of an embodiment of a RAN node in accordance with the present disclosure.

FIG. 3b is a schematic block diagram functionally illustrating an embodiment of the RAN node 3 in FIG. 3a. As previously mentioned, the processor circuitry 31 may run software 41 for enabling the RAN node to perform an embodiment of a method of the present disclosure, whereby functional modules may be formed in the RAN node 3 e.g. in the processor circuitry 31 for performing the different steps of the method. These modules are schematically illustrated as blocks within the RAN node 3. Thus, the RAN node 3 comprises a first RTT estimation module 301 for estimating a first RTT between the RAN node 3 and a terminal device 4 connected via the RAN node. The RAN node 3 also comprises a second RTT estimation module 302 for estimating a second RTT between the RAN node 3 and a server 6 of a service provider configured for providing a service to the terminal device via the RAN node. The RAN node 3 also comprises an end-to-end RTT estimation module 303 for estimating an end-to-end RTT between the terminal device 4 and the server 6, based on the first RTT and the second RTT. The RAN node 3 also comprises a contribution determination module 304 for determining a relative contribution of the second RTT to the end-to-end RTT. The RAN node 3 also comprises an indication of relative contribution determination module 305 for determining that the relative contribution of the second RTT indicates that signalling performance between the server and the terminal device 4 is limited by the signalling performance between the server 6 and the RAN 2.

In some embodiments, the RAN node 3 also comprises a sending module 306 for, based on the determining that the relative contribution of the second RTT indicates that signalling performance between the server and the terminal device 4 is limited by the signalling performance between the server 6 and the RAN 2, sending information to the terminal device 4 indicating that the signalling performance between the server 6 and the terminal device 4 is limited by the signalling performance between the server 6 and the RAN 2.

Additionally or alternatively, the RAN node 3 comprises a sending module 306 for, based on the determining that the relative contribution of the second RTT indicates that signalling performance between the server and the terminal device 4 is limited by the signalling performance between the server 6 and the RAN 2, deciding not to send information about throughput between the RAN 2 and the terminal device 4 to the terminal device. Such throughput information may be irrelevant to the terminal device for deciding on e.g. streaming rate (if the service is a streaming service) since the bottleneck has been determined to be between the RAN and the server 6. Thus, the RAN node 3 may actively decide not to send the throughput information which it would otherwise have sent to the terminal device.

Alternatively, the modules of FIG. 3b may be formed by hardware, or by a combination of software and hardware.

According to an aspect of the present disclosure, there may be provided a RAN node 3 for a communication network 1. The RAN node is configured for locating a communication bottleneck in said communication network. The RAN node comprises means 301 for estimating a first RTT between the RAN 2 and a terminal device 4 connected via the RAN. The RAN node also comprises means 302 for estimating a second RTT between the RAN 2 and a server 6 of a service provider configured for providing a service to the terminal device 4 via the RAN. The RAN node also comprises means 303 for estimating an end-to-end RTT between the terminal device 4 and the server 6, based on the first RTT and the second RTT. The RAN node also comprises means 304 for determining a relative contribution of the second RTT to the end-to-end RTT. The RAN node also comprises means 305 for determining that the relative contribution of the second RTT indicates that signalling performance between the server and the terminal device 4 is limited by the signalling performance between the server 6 and the RAN 2.

The RAN node may comprise means 306 for, based on the determining that the relative contribution of the second RTT indicates that signalling performance between the server and the terminal device 4 is limited by the signalling performance between the server 6 and the RAN 2, sending information to the terminal device 4 indicating that the signalling performance between the server 6 and the terminal device 4 is limited by the signalling performance between the server 6 and the RAN 2.

The RAN node may comprise means 306 for, based on the determining that the relative contribution of the second RTT indicates that signalling performance between the server and the terminal device 4 is limited by the signalling performance between the server 6 and the RAN 2, deciding not to send information about throughput between the RAN 2 and the terminal device 4 to the terminal device. Such throughput information may be irrelevant to the terminal device for deciding on e.g. streaming rate (if the service is a streaming service) since the bottleneck has been determined to be between the RAN and the server 6. Thus, the RAN node 3 may actively decide not to send the throughput information which it would otherwise have sent to the terminal device.

Figure 4:
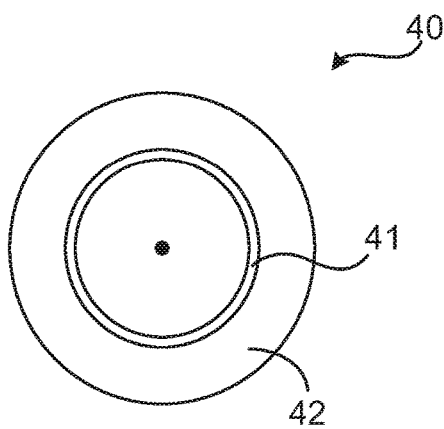
FIG. 4 is a schematic illustration of an embodiment of a computer program product in accordance with the present disclosure.

FIG. 4 illustrates an embodiment of a computer program product 40. The computer program product 40 comprises a computer readable (e.g. non-volatile and/or non-transitory) medium 42 comprising software/computer program 41 in the form of computer-executable components. The computer program 41 may be configured to cause a RAN node 3, e.g. as discussed herein, to perform an embodiment of the method of the present disclosure. The computer program may be run on the processor circuitry 31 of the RAN node 3 for causing it to perform the method. The computer program product 40 may e.g. be comprised in a storage unit or memory 32 comprised in the RAN node 3 and associated with the processor circuitry 31. Alternatively, the computer program product 40 may be, or be part of, a separate, e.g. mobile, storage means/medium, such as a computer readable disc, e.g. CD or DVD or hard disc/drive, or a solid state storage medium, e.g. a RAM or Flash memory. Further examples of the storage medium can include, but are not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Embodiments of the present disclosure may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

According to an aspect of the present disclosure, there is provided a computer program product 40 comprising computer-executable components 41 for causing a RAN node 3 to perform an embodiment of the method of the present disclosure when the computer-executable components are run on processor circuitry 31 comprised in the RAN node.

According to another aspect of the present disclosure, there is provided a computer program 41 for locating a communication bottleneck in a communication network 1 comprising a RAN 2. The computer program comprises computer program code which is able to, when run on processor circuitry 31 of a RAN node 3, cause the RAN node to estimate a first RTT between the RAN node 3 and a terminal device 4 connected via the RAN node. The code is also able to cause the RAN node to estimate a second RTT between the RAN node 3 and a server 6 of a service provider configured for providing a service to the terminal device via the RAN node. The code is also able to cause the RAN node to estimate an end-to-end RTT between the terminal device 4 and the server 6, based on the first RTT and the second RTT. The code is also able to cause the RAN node to determine a relative contribution of the second RTT to the end-to-end RTT. The code is also able to cause the RAN node to determine that the relative contribution of the second RTT indicates that signalling performance between the server and the terminal device 4 is limited by the signalling performance between the server 6 and the RAN 2.

According to another aspect of the present disclosure, there is provided a computer program product 40 comprising an embodiment of the computer program 41 of the present disclosure and a computer readable means 42 on which the computer program is stored.

Figure 5A:
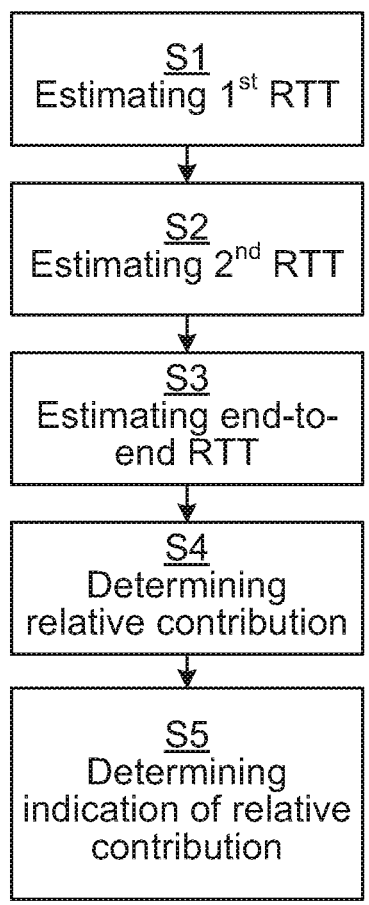
FIG. 5a is a schematic flow chart of an embodiment of a method in accordance with the present disclosure.

FIG. 5a is a flow chart of an embodiment of the method of the present disclosure. The method is performed in a RAN 2 comprised in a communication network 1. The method is for locating a communication bottleneck in said communication network. The method comprises estimating S1 a first RTT between the RAN 2 and a terminal device 4 connected via the RAN. The method also comprises estimating S2 a second RTT between the RAN 2 and a server 6 of a service provider configured for providing a service to the terminal device 4 via the RAN. The method also comprises estimating S3 an end-to-end RTT between the terminal device 4 and the server 6, based on the first RTT and the second RTT The method also comprises determining S4 a relative contribution of the second RTT to the end-to-end RTT The method also comprises determining S5 that the relative contribution of the second RTT indicates that signalling performance between the server and the terminal device 4 is limited by the signalling performance between the server 6 and the RAN 2.

Figure 5B:
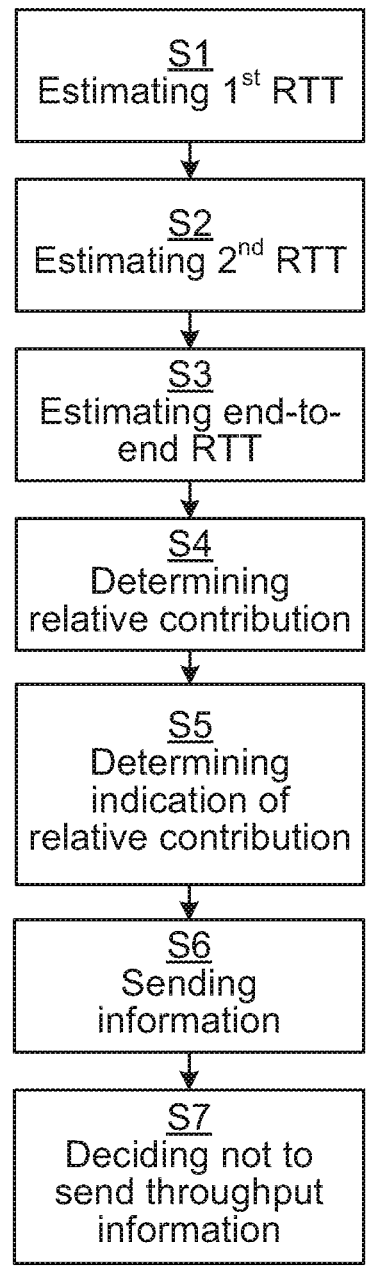
FIG. 5b is a schematic flow chart of another embodiment of a method in accordance with the present disclosure.

FIG. 5b is a flow chart of another embodiment of the method of the present disclosure. In addition to the steps S1-S5 already discussed in relation to FIG. 5a, the method may comprise, based on the determining S5 that the relative contribution of the second RTT indicates that signalling performance between the server and the terminal device 4 is limited by the signalling performance between the server 6 and the RAN 2, sending S6 information to the terminal device 4 indicating that the signalling performance between the server 6 and the terminal device 4 is limited by the signalling performance between the server 6 and the RAN 2. Thus, the terminal device 4 may be informed about that the bottleneck is likely located between the RAN and the server, why the signalling performance (e.g. the throughput) between the terminal/client and the server is limited by the signalling performance between the RAN and the server.

Additionally or alternatively, the method may also comprise, based on the determining S5 that the relative contribution of the second RTT indicates that signalling performance between the server and the terminal device 4 is limited by the signalling performance between the server 6 and the RAN 2, deciding S7 not to send information about throughput between the RAN 2 and the terminal device 4 to the terminal device. As discussed above, the RAN may e.g. by means of an IGW, be configured to inform the terminal device/client about available throughput via the RAN, e.g. for adaptive streaming. However, such throughput information may be irrelevant to the terminal device for deciding on e.g. streaming rate (if the service is a streaming service) since the bottleneck has been determined to be between the RAN and the server 6. Thus, the RAN node 3 may actively decide not to send the throughput information which it would otherwise have sent to the terminal device.

An advantage with embodiments of the present disclosure may be that with information about the RAN node 3 contribution of end-to-end RTT, the relevance of information about available throughput in the RAN node can be determined. The actions based on available throughput in RAN could therefore be based on how much the RAN node contributes to end-to-end QoE.

In some embodiments of the present disclosure, the first RTT is estimated S1 between the RAN 2 and a service client 8 in the terminal device 4. It is noted that the RTT measured on service level to the client 8 is longer than only the radio part. There is delay also within the terminal device, from its radio interface to the client (e.g. an app in the application layer of the terminal device) and back to the radio interface, which is included in the first RTT.

Thus, in some embodiments, the estimating a first RTT comprises estimating a time from when a communication packet for the service client 8 reaches the RAN 2 to when a response packet, from the service client in response to the communication packet, reaches the RAN. Any delay within the RAN in the downlink (DL) is thus included in the first RTT.

Similarly, in some embodiments of the present disclosure, the estimating S2 a second RTT comprises estimating a time from when a communication packet from the terminal device 4, for the server 6, reaches the RAN 2 to when a response packet from the server, for the terminal device, in response to the communication packet, reaches the RAN. Any delay within the RAN in the uplink (UL) is thus included in the first RTT.

In some embodiments of the present disclosure, the determining S5 that the relative contribution of the second RTT indicates that signalling performance between the server and the terminal device 4 is limited by the signalling performance between the server 6 and the RAN 2 comprises determining that a relative contribution of the first RTT to the end-to-end RTT is below a predetermined first threshold or that the relative contribution of the second RTT is above a predetermined second threshold. If the relative contribution of the second RTT is above a threshold, e.g. the second RTT is longer than the first RTT (second threshold is 50%) or longer by a predetermined margin than the first RTT (second threshold is higher than 50%), this may indicate that the bottleneck for signalling throughput/bandwidth is between the RAN 2 and the server 6 rather than between the RAN and the terminal 4. Thus, the signalling performance (e.g. throughput) between the server and the terminal is assumed to be limited by the signalling performance between the server 6 and the RAN 2. Similarly, since the end-to-end RTT typically is the sum of the first and second RTTs, the same conclusion may be drawn if the contribution of the first RTT is below a first threshold, e.g. below 50% or below a first threshold which is less than 50%. Of course, there may be no direct link between RTT and throughput, but if there is much delay between the RAN and the server, this may be an indication that the signalling performance/throughput bottleneck is located there and not between the RAN and the terminal device.

In some embodiments of the present disclosure, the first and/or the second RTT is estimated S1 and/or S2 by means of packet inspection, e.g. Deep Packet Inspection, DPI.

The communication protocol may be TCP, User Datagram Protocol (UDP) or Quick UDP Internet Connections (QUIC), or any other protocol with a congestion mechanism. A transport protocol can have a mechanism that detects how fast it can send data packets. It tries to send more and more packets, but if there is a lost packet or a packet is not delivered in time, this is seen as congestion and the protocol backs-off and decreases the sending rate. UDP does not have congestion mechanism, but TCP and QUIC does.

In accordance with embodiments of the present disclosure it is proposed that data delivery actions related to available throughput in RAN 2 to the terminal 4 is based not only on the available throughput but also on information on how much RAN nodes 3 contribute to the total end-to-end delay/RTT or how relevant the RAN throughput information is. The information may either be sent to the terminal device 4, or be used by the RAN itself. With this information, in relation to estimations of total end-to-end RTT, a more correct decision about how to utilize the information about the throughput estimations in RAN could be made.

In a similar way as the end-point (i.e. TCP protocol) determines the total available end-to-end throughput through RTT measurements, the RTT contribution between the RAN 2 and the terminal 4, e.g. client 8, is measured/estimated by the RAN. There are several methods for estimating the RTT between the RAN and the client, and a few examples are given below for completeness of the disclosure.

- The RAN node 3 may perform packet inspection, i.e. DPI, to determine the first RTT for a packet. The time from a packet enters the RAN until a corresponding response to the packet is returned to the RAN may be measured, or
- The RAN node 3 may monitor the terminal device buffer in the MAC layer of the RAN, to measure the time from a packet entering the RAN until leaving the RAN. A generic factor for radio link delay may then be added. The first RTT may then be estimated as two times that value.

Through packet inspection, it may be possible for the RAN node 3 to determine the second RTT, from the RAN to the server 6. By adding up the estimations about the first RTT and the second RTT, the RAN node may estimate the total end-to-end RTT. By knowing the proportions (i.e. relative contributions) of the first and second RTTs, respectively, the relevance of the estimated throughput on the link between the RAN and the client may be determined. If the RTT towards the server is the dominating part of the total end-to-end RTT, the relevance of the estimated throughput on the link between the RAN and the client may be low and actions for delivery of data should not only, or not at all, be based on that information.

The actions to be taken based on the information about the RAN contribution to the total end-to-end RTT, may either be performed in the RAN 2 or by the terminal device 4 as the receiver of the information about available throughput in the RAN.

When the RAN node 3 has information about the total end-to-end RTT, it may also estimate the contribution from the first and/or second RTT. With this information, the RAN node may make the decision to send an estimation of throughput to the terminal device 4 if this information is deemed relevant (i.e. the RAN is the bottleneck). Otherwise it may decide S7 not to send the throughput information.

If the RAN node estimations of the first and/or second RTT is sent to the terminal device, the terminal device may compare this value to its own estimations of end-to-end RTT to determine if the RAN is the main bottleneck and thereby whether the estimations of available throughput from RAN are relevant or not.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed in a Radio Access Network, RAN, comprised in a communication network, for locating a communication bottleneck in said communication network, the method comprising:
   estimating a first Round Trip Time, RTT, between the RAN and a terminal device connected via the RAN;
   estimating a second RTT between the RAN and a server of a service provider configured for providing a service to the terminal device via the RAN;
   estimating an end-to-end RTT between the terminal device and the server, based on the first RTT and the second RTT;
   determining a relative contribution of the second RTT to the end-to-end RTT;
   determining that the relative contribution of the second RTT indicates that signaling performance between the server and the terminal device is limited by the signaling performance between the server and the RAN, wherein determining that the relative contribution of the second RTT indicates that the signaling performance between the server and the terminal device is limited by the signaling performance between the server and the RAN comprises determining that a relative contribution of the first RTT to the end-to-end RTT is below a predetermined first threshold or that the relative contribution of the second RTT is above a predetermined second threshold; and
   based on determining that the relative contribution of the second RTT indicates that the signaling performance between the server and the terminal device is limited by the signaling performance between the server and the RAN, sending information to the terminal device indicating that the signaling performance between the server and the terminal device is limited by the signaling performance between the server and the RAN.

2. The method of claim 1, wherein the first RTT is estimated between the RAN and a service client in the terminal device.

3. The method of claim 2, wherein estimating the first RTT comprises estimating a time from when a communication packet for the service client reaches the RAN to when a response packet, from the service client in response to the communication packet, reaches the RAN.

4. The method of claim 1, wherein estimating the second RTT comprises estimating a time from when a communication packet from the terminal device, for the server, reaches the RAN to when a response packet from the server, for the terminal device, in response to the communication packet, reaches the RAN.

5. The method of claim 1, wherein the predetermined first threshold is less than 50% or wherein the predetermined second threshold is at least 50%.

6. The method of claim 1, wherein the first and/or the second RTT is estimated using packet inspection.

7. The method of claim 1, wherein the signaling performance comprises signaling throughput.

8. A RAN node for a communication network, configured for locating a communication bottleneck in said communication network, the RAN node comprising:
   processor circuitry; and
   storage storing instructions executable by said processor circuitry whereby said RAN node is operative to:
      estimate a first Round Trip Time, RTT, between the RAN node and a terminal device connected via the RAN node;
      estimate a second RTT between the RAN node and a server of a service provider configured for providing a service to the terminal device via the RAN node;
      estimate an end-to-end RTT between the terminal device and the server, based on the first RTT and the second RTT;
      determine a relative contribution of the second RTT to the end-to-end RTT;
      determine that the relative contribution of the second RTT indicates that signaling performance between the server and the terminal device is limited by the signaling performance between the server and the RAN node, whereby said RAN is further operative to determine that a relative contribution of the first RTT to the end-to-end RTT is below a predetermined first threshold or that the relative contribution of the second RTT is above a predetermined second threshold; and
      based on determining that the relative contribution of the second RTT indicates that the signaling performance between the server and the terminal device is limited by the signaling performance between the server and the RAN, send information to the terminal device indicating that the signaling performance between the server and the terminal device is limited by the signaling performance between the server and the RAN.

9. A computer program for locating a communication bottleneck in a communication network comprising a Radio Access Network, RAN, the computer program comprising computer program code which is able to, when run on processor circuitry of a RAN node, cause the RAN node to:
- estimate a first Round Trip Time, RTT, between the RAN node and a terminal device connected via the RAN node;
- estimate a second RTT between the RAN node and a server of a service provider configured for providing a service to the terminal device via the RAN node;
- estimate an end-to-end RTT between the terminal device and the server, based on the first RTT and the second RTT;
- determine a relative contribution of the second RTT to the end-to-end RTT;
- determine that the relative contribution of the second RTT indicates that signaling performance between the server and the terminal device is limited by the signaling performance between the server and the RAN, the computer program code further causing the RAN node to determine that a relative contribution of the first RTT to the end-to-end RTT is below a predetermined first threshold or that the relative contribution of the second RTT is above a predetermined second threshold; and
- based on determining that the relative contribution of the second RTT indicates that the signaling performance between the server and the terminal device is limited by the signaling performance between the server and the RAN, send information to the terminal device indicating that the signaling performance between the server and the terminal device is limited by the signaling performance between the server and the RAN.

10. A non-transitory computer-readable storage medium comprising a computer program product including instructions to cause at least one processor to:
- estimate a first Round Trip Time, RTT, between a Radio Access Network, RAN, and a terminal device connected the RAN;
- estimate a second RTT between the RAN and a server of a service provider configured for providing a service to the terminal device via the RAN;
- estimate an end-to-end RTT between the terminal device and the server, based on the first RTT and the second RTT;
- determine a relative contribution of the second RTT to the end-to-end RTT;
- determine that the relative contribution of the second RTT indicates that signaling performance between the server and the terminal device is limited by the signaling performance between the server and the RAN, further causing the at least one processor to determine that a relative contribution of the first RTT to the end-to-end RTT is below a predetermined first threshold or that the relative contribution of the second RTT is above a predetermined second threshold; and
- based on determining that the relative contribution of the second RTT indicates that the signaling performance between the server and the terminal device is limited by the signaling performance between the server and the RAN, send information to the terminal device indicating that the signaling performance between the server and the terminal device is limited by the signaling performance between the server and the RAN.

11. The non-transitory computer-readable storage medium of claim 10, wherein the first RTT is estimated between the RAN and a service client in the terminal device.

12. The non-transitory computer-readable storage medium of claim 11, wherein to estimate the first RTT comprises estimating a time from when a communication packet for the service client reaches the RAN to when a response packet, from the service client in response to the communication packet, reaches the RAN.

13. The non-transitory computer-readable storage medium of claim 10, wherein to estimate the second RTT comprises estimating a time from when a communication packet from the terminal device, for the server, reaches the RAN to when a response packet from the server, for the terminal device, in response to the communication packet, reaches the RAN.

14. The non-transitory computer-readable storage medium of claim 10, wherein the predetermined first threshold is less than 50% or wherein the predetermined second threshold is at least 50%.

* * * * *